(12) United States Patent
Shum et al.

(10) Patent No.: US 12,505,007 B2
(45) Date of Patent: Dec. 23, 2025

(54) UPDATING COMPUTING ERROR ANALYSIS WINDOWS

(71) Applicant: International Business Machines Corporation, Armonk, NY (US)

(72) Inventors: Stephanie Carys Shum, Wappingers Falls, NY (US); Patrick John Clas, Pine Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/661,275

(22) Filed: May 10, 2024

(65) Prior Publication Data

US 2025/0348373 A1 Nov. 13, 2025

(51) Int. Cl.
*G06F 11/07* (2006.01)
(52) U.S. Cl.
CPC ........ *G06F 11/079* (2013.01); *G06F 11/0709* (2013.01)
(58) Field of Classification Search
CPC .. G06F 11/0709; G06F 11/076; G06F 11/079; G06F 11/0793
See application file for complete search history.

(56) References Cited

U.S. PATENT DOCUMENTS

| | | | |
|---|---|---|---|
| 5,774,668 A * | 6/1998 | Choquier | G06F 9/505 |
| | | | 709/227 |
| 7,490,145 B2 * | 2/2009 | Sylor | H04L 41/22 |
| | | | 709/224 |
| 7,757,129 B2 | 7/2010 | Bohizic et al. | |
| 9,043,770 B2 | 5/2015 | Aliseychik et al. | |
| 9,298,535 B2 | 3/2016 | Haines | |
| 10,353,765 B2 * | 7/2019 | Edrich | G06F 11/0706 |
| 11,321,164 B2 * | 5/2022 | Moss | G06F 11/0751 |
| 11,755,459 B2 | 9/2023 | Segev et al. | |
| 2007/0079291 A1 | 4/2007 | Roth | |
| 2009/0276663 A1 | 11/2009 | Kaksonen | |

(Continued)

FOREIGN PATENT DOCUMENTS

| | | |
|---|---|---|
| CN | 102880545 A | 1/2013 |
| CN | 107105514 A | 8/2017 |
| CN | 104702526 B | 11/2018 |

OTHER PUBLICATIONS

Rao, Xiang, Huaimin Wang, Dianxi Shi, Zhenbang Chen, Hua Cai, Qi Zhou, and Tingtao Sun. "Identifying faults in large-scale distributed systems by filtering noisy error logs." IEEE/IFIP 41st International Conference on Dependable Systems and Networks Workshops (DSN-W), pp. 140-145, IEEE, 2011. (Year: 2011).*

(Continued)

*Primary Examiner* — Joseph R Kudirka
(74) *Attorney, Agent, or Firm* — Patterson + Sheridan, LLP

(57) ABSTRACT

Techniques for improved computing error analysis are provided. An error log for a computing environment is accessed, and an error analysis window is opened based on the error log, the error analysis window having an initial duration. A set of additional error logs, for the computing environment, within the error analysis window are accessed. Based at least in part on the set of additional error logs, a window extension is determined. The error analysis window is extended based on the window extension, and an error summary is generated based on one or more error logs received during the extended error analysis window.

20 Claims, 6 Drawing Sheets

(56) References Cited

U.S. PATENT DOCUMENTS

2010/0082518 A1     4/2010   Gaffga et al.
2022/0391306 A1    12/2022   Vezier et al.

OTHER PUBLICATIONS

Wisdom et al., "Enhancement and Recognition of Reverberant and Noisy Speech by Extending Its Coherence", arXiv:1509.00533v1 [cs.SD] Sep. 2, 2015.

U.S. Appl. No. 18/499,302 titled "Updating Call Home Data Limits and Priorities" filed Nov. 1, 2023.

U.S. Appl. No. 18/499,366 titled "Prioritization of Call Home Data" filed Nov. 1, 2023.

\* cited by examiner

UPDATING COMPUTING ERROR ANALYSIS WINDOWS

BACKGROUND

The present disclosure relates to computing error analysis, and more specifically, to updating error analysis windows to improve error analysis.

Computing environments (which may include any number and combination or systems, such as cloud-based systems, mainframe computing systems, terminals or control systems, and the like) are generally capable of encountering a wide variety of errors during normal (or abnormal) operations. The particular errors encountered may vary significantly depending on the architecture and operations being performed, and at times it can be exceedingly difficult to identify the root cause. Moreover, in many cases, one error may cause a cascade or sequence of additional errors, further complicating error analysis.

In some systems, error analysis windows are used to group related (or potentially related) errors. An error analysis window (also referred to in some aspects as a problem analysis window) refers to a window of time where related errors that occur within the window can be grouped or reported together for analysis. Generally, the length of the error window is a manually defined static duration.

SUMMARY

According to one embodiment of the present disclosure, a method is provided. The method includes accessing a first error log for a computing environment; opening a first error analysis window based on the first error log, the first error analysis window having a first initial duration; accessing a first set of additional error logs, for the computing environment, within the first error analysis window; determining, based at least in part on the first set of additional error logs, a first window extension; extending the first error analysis window based on the first window extension; and generating a first error summary based on one or more error logs received during the extended first error analysis window.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; and a computer program product embodied on a computer-readable storage medium comprising code for performing the aforementioned methods as well as those further described herein.

The following description and the related drawings set forth in detail certain illustrative features of one or more embodiments.

DETAILED DESCRIPTION

Figure 1:
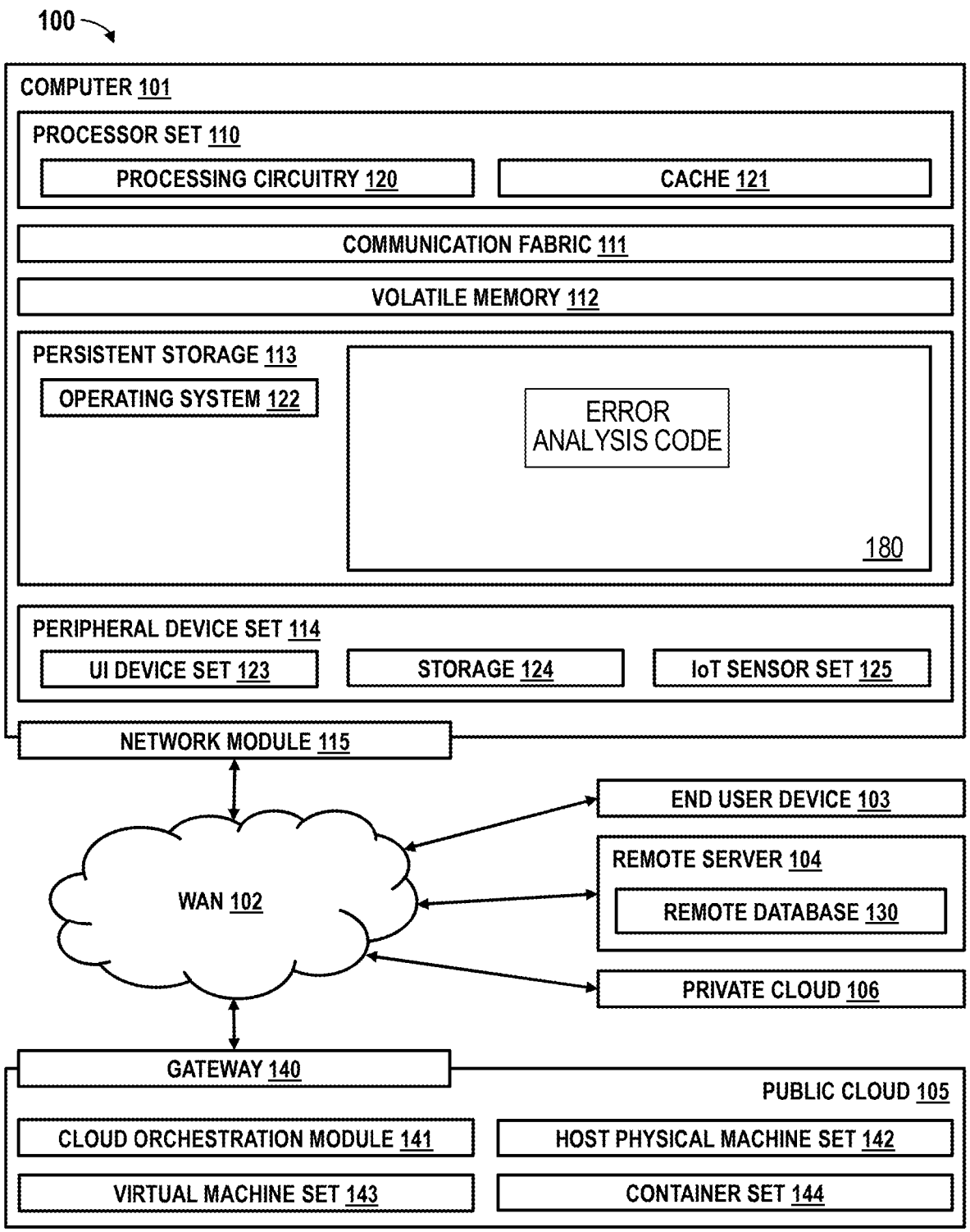
FIG. 1 depicts an example computing environment for the execution of at least some of the computer code involved in performing the inventive methods.

Embodiments of the present disclosure provide techniques for improved error analysis in computing environments based on dynamically updating error analysis windows.

In some embodiments, techniques are provided to selectively extend error analysis windows to allow for the collection of other errors that resulted from the root error within the window. In some embodiments, one or more error relation mappings are used to quantify or identify errors based on their similarity, priority, and/or causation. In some embodiments, factors such as the error similarity and/or causation, timing within the window, machine noisiness, and/or processor consumption can be evaluated to make updates to the length of the analysis window.

In some embodiments, an accurate problem analysis window can significantly improve the error analysis process, such as by preventing reporting (sometimes referred to as "calling home") the same root cause error multiple times. This prevents additional (unnecessary) analysis of the error(s), while also reducing the visible error imprint, thus ensuring transparency and trust. Additionally, embodiments of the present disclosure can ensure (or at least improve the probability) that all related errors are included in the initial report, rather than having to request more information subsequently, which saves both time and money. For example, by improving the problem analysis window, the compute resources of the analyzing system(s) can be substantially reduced. For example, using extended analysis windows means that the related errors are more likely to be analyzed together, which reduces memory usage, processor time, power consumption, heat generation, and the like (as compared to conventional solutions that often report related errors separately).

In some embodiments, similarity and causation relationships between errors can be evaluated to extend a given error analysis window, with further adjustments possible based on when, within the window, the error(s) occur, as well as the priority of the error(s). In some embodiments, the machine noisiness (e.g., the number or rate of errors occurring) may be evaluated to determine whether the analysis window should be further increased. In some embodiments, the computing consumption or utilization (e.g., the amount of computing resources that are currently being utilized) may be further analyzed to determine whether to increase the analysis window. In some embodiments, a window extension limit can be defined based on the highest priority error that occurs within the analysis window, ensuring the analysis does not expand unreasonably.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Example Computing Environment

FIG. 1 depicts an example computing environment for the execution of at least some of the computer code involved in performing the inventive methods.

Computing environment 100 contains an example of an environment for the execution of at least some of the computer code involved in performing the inventive methods, such as error analysis code 180. In addition to error analysis code 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and error analysis code 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in error analysis code 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in error analysis code 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Example System for Updating Error Analysis Windows in a Computing Environment

Figure 2:
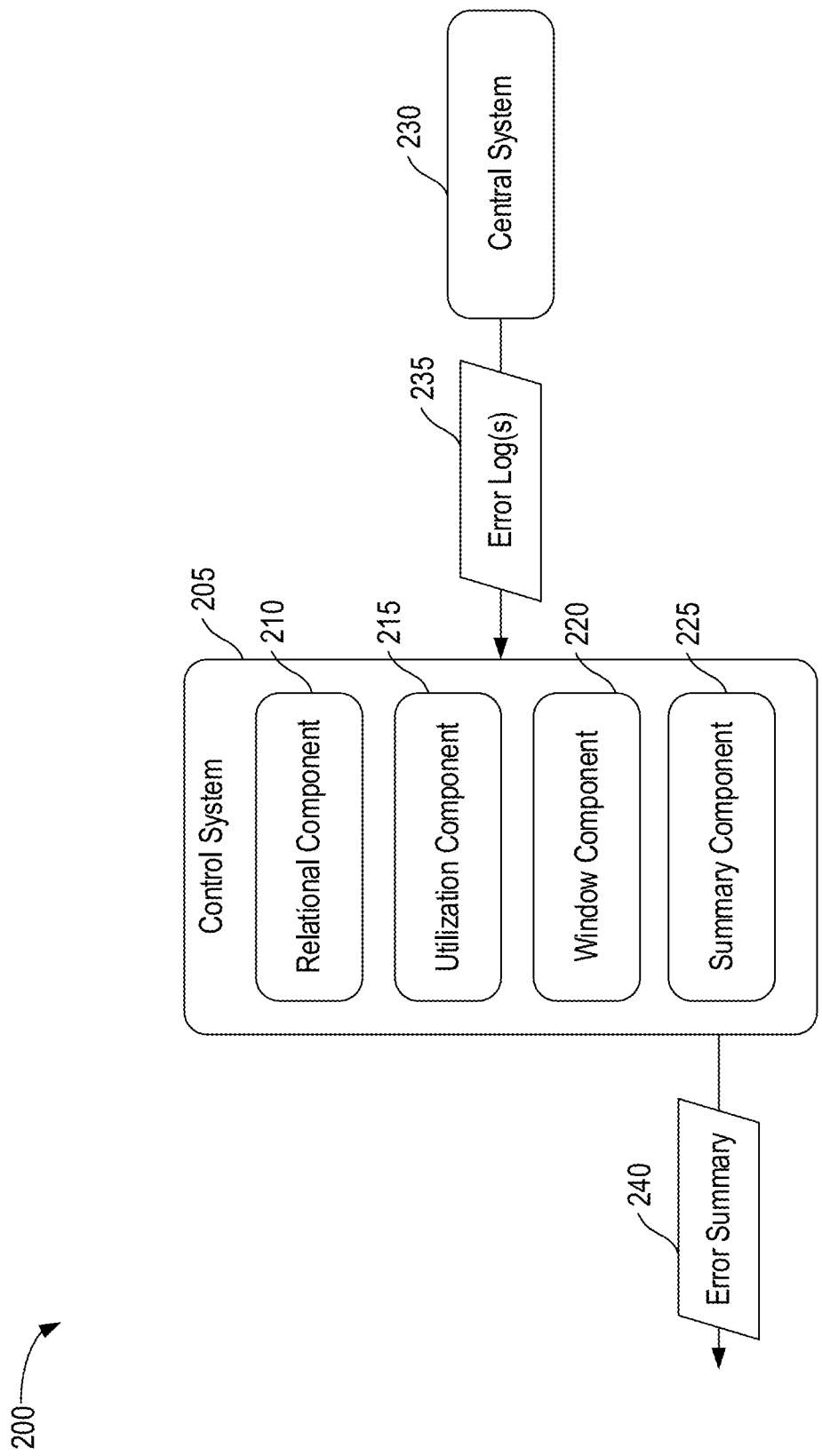
FIG. 2 depicts a system for updating error analysis windows in a computing environment, according to some embodiments of the present disclosure.

FIG. 2 depicts a system for updating error analysis windows in a computing environment 200, according to some embodiments of the present disclosure.

In the illustrated example, a control system 205 (which may correspond to or include the error analysis code 180 of FIG. 1) is used to perform or facilitate error analysis for the computing environment 200. The depicted computing environment 200 includes a central system 230 and the control system 205. Although depicted as discrete systems for conceptual clarity, in some embodiments, some or all of the operations of the control system 205 may be implemented on the central system 230 (and vice versa). Further, although two systems are depicted, in some embodiments, there may be any number of computing systems in the computing environment 200.

The control system 205 generally corresponds to a computing system, which may be implemented using hardware, software, or a combination of hardware and software, used to perform or facilitate error analysis. For example, the control system 205 may correspond to a management system or terminal, a support system, and the like. The central system 230 generally corresponds to a computing system used to perform various operations or processes for a variety of purposes. For example, the central system 230 may correspond to a mainframe or other computing system used to provide a variety of operations or services for any number and variety of users. In the illustrated example, the control system 205 monitors the operations of the central system 230 to detect and/or evaluate errors (represented as error logs 235 in the illustrated example).

For example, in some embodiments, the central system 230 may generate error logs 235 reflecting any errors encountered during processing, and report these error logs 235 to the control system 205. In other embodiments, the control system 205 may monitor the operations of the central system 230 in order to generate error logs 235. In some embodiments, the control system 205 may further generate error logs for the operations of the control system 205 (e.g., if the control system 205 encounters any errors during its operations, such as during error analysis).

Generally, each error log 235 indicates a single error occurrence. In some embodiments, the error logs 235 are identified or labeled based on error codes (referred to in some embodiments as reference codes or refcodes) to indicate what error occurred. In some embodiments, these error codes may be used to identify or quantify relationships or similarities between errors, relative priorities of the errors (e.g., based on how significant or problematic the error is), and the like using defined mappings, as discussed in more detail below.

In the illustrated example, the control system 205 includes a relational component 210, a utilization component 215, a window component 220, and a summary component 225. Although depicted as discrete components for conceptual clarity, in embodiments, the operations of the depicted components (and others not illustrated) may be combined or distributed across any number of components and systems.

In some embodiments, the relational component 210 is used to evaluate or quantify the relationships and/or causation between error logs 235. In some embodiments, the relational component 210 accesses a defined set of relational or similarity mappings indicating, for each error type (e.g., each error or reference code) the similarity, relationship, and/or causation to each other error type. As used herein, "accessing" data may generally include receiving, requesting, retrieving, generating, obtaining, or otherwise gaining access to the data. For example, the relational component 210 may access the mapping(s) from one or more other systems or repositories, or may itself generate the mappings. In some embodiments, the similarity mappings include binary classifications indicating whether any pair of error codes are "similar" or "related." Although depicted as a component residing in the control system 205 for conceptual clarity, in some embodiments, the relational component 210 may reside entirely or partially on one or more other systems. For example, in some aspects, a component in a cloud or other remote system may evaluate and quantify the relationships, and may provide the determined relational mappings to the control system 205 for use. In some aspects, the control system 205 may use a static or fixed set of mappings. In some aspects, the control system 205 may periodically request updated mappings. In some aspects, the other system(s) that generate the mappings may provide updated mappings (e.g., periodically or in response to determining that the mappings have changed).

In some embodiments, when a new error log 235 is received or generated, the relational component 210 may use the mappings to determine whether the error log 235 belongs to the existing error analysis window that is open (if any), such as whether it is related or similar to one or more error(s) already included in the window. If so, the relational component 210 can add the new error log 235 to the existing window. In some embodiments, if no window is currently open, the relational component 210 (or another component) may open or initiate a window for the new error log. In some embodiments, if the new error log 235 is not sufficiently related (based on the mappings) to the existing window, the relational component 210 can instead report the new error log 235 immediately (e.g., "call home" the new error log 235, rather than including in the open window).

In some embodiments, if the relational component 210 determines that a new error log 235 belongs to the existing window, the relational component 210 may further quantify the similarity or relationship(s) between the new error log 235 and one or more other errors in the window (e.g., to the root error that initiated the window). This relationship may be used to determine the window extension, if any, as discussed in more detail below.

In some embodiments, the relational component 210 may further determine when the error log(s) 235 occurred (e.g., using timestamps indicating when the error occurred and/or when the log was generated). In some embodiments, as discussed in more detail below, the particular timing of the errors relative to each other and/or relative to the error analysis window can similarly be used to determine the window extension, if any.

In the illustrated example, the utilization component 215 may generally be used to evaluate the utilization and/or noisiness of the computing environment 200 in order to determine window extensions. In some embodiments, the computational resource utilization may correspond to the consumption or usage of resources by one or more systems in the environment, such as processor usage (e.g., the percentage of processor time or cycles that are being used), memory usage (e.g., the percentage or amount of memory that is occupied), and the like. In some embodiments, the utilization component 215 evaluates or records the utilization information in relation to the error logs 235. For example, the utilization component 215 may determine the utilization of one or more resources as of the time when each error occurs (e.g., the memory usage when the error was encountered) and/or during a window after the error occurs (e.g., during the error analysis window).

In some embodiments, the noisiness of the computing environment 200 may correspond to the number of error(s) occurring with respect to any given error log 235 (e.g., the number of other errors that occurred just before and/or just after the given error, such as within a defined time and/or within the error analysis window). In some embodiments, the noisiness may refer to the number of dissimilar errors with respect to a given error log 235. That is, the noisiness of the environment, with respect to a given error log 235, may correspond to the number of unrelated errors that occurred during the window (e.g., errors which occurred at the same or similar time, but that were not related to the given error log 235 and belonged to other error analysis window(s)).

In the illustrated example, the window component 220 can evaluate various features or information (e.g., generated by the relational component 210 and/or utilization component 215) to determine the appropriate duration of the error analysis windows (e.g., to determine the extension).

For example, as discussed above, if the window component 220 determines (based on the relational or similarity information provided by the relational component 210) that one or more similar errors occurred within the error analysis window, the window component 220 may determine to extend the analysis window to ensure additional related or similar error logs 235 are not reported or treated as unique or unrelated errors.

In some embodiments, the window component 220 evaluate the timing of related or similar errors occurring within the window to determine the extension. For example, in some embodiments, if a similar error occurs in the first half of the analysis window, the window component 220 may determine to leave window length unchanged (e.g., because there is ample time left in the window and the risk of missing related errors is low). In some embodiments, if a similar error occurs in the second half of the analysis window, the window component 220 may determine to extend the window to ensure that other similar or related errors (sometimes referred to as sympathy errors) are included in the window and are not reported as unique errors. In some embodiments, dissimilar or unrelated errors seen within a given analysis window for a given error may be reported separately and not included in the analysis window for the given error.

In some embodiments, the noisiness of the computing environment 200 corresponds to the total number of unique errors occurring in the environment at a given time. In some embodiments, if a large number of unrelated errors are occurring within the window, the window component 220 may determine to extend the analysis window to ensure that any other related errors, with respect to the given error that initiated the window, (which may be delayed due to the noise) are encapsulated. For example, in some embodiments, if at least a threshold number of dissimilar or unrelated errors (e.g., five or more) occur within the window for a given error, the window component 220 may determine that the environment is "noisy," and the window may be increased to account for potentially delayed processing of errors that are related to the given error.

In some embodiments, the processor and/or memory usage or utilization of the environment 200 may be evaluated, as discussed above. For example, if the processor and/or memory usage is high (e.g., above one or more thresholds), the window component 220 may determine to extend the analysis window to ensure that any delayed errors (e.g., other errors that occur with a delay and/or where the reporting is delayed due to the high utilization) are encapsulated.

In some embodiments, the window extension determined by the window component 220 is constrained or limited to ensure that a given window is not extended indefinitely. For example, in some embodiments, the window component 220 may evaluate the priority (e.g., based on a defined priority mapping or other data indicating the priority of each error code) of the error logs 235 that correspond to the analysis window, and the maximum window extension may be determined based on the window extension of the highest priority error. That is, in some embodiments, each error code may have a corresponding window extension or duration indicating how long the analysis window should be extended (or how long the initial window duration should be) if the error is detected. These durations and/or extensions may be determined based on a mapping (e.g., manually defined). In some embodiments, the window component 220 determines that the maximum a given error analysis window can be extended corresponds to the extension and/or duration of the error log 235 having the highest priority in the window.

In the illustrated embodiment, when an error analysis window ends, the summary component 225 may generate a summary based on the error logs 235 included in the window. In some embodiments, the error summary 240 includes a list of the relevant error logs 235 (e.g., the root error that initiated the window, along with the detected set of similar errors that occurred during the window). In some embodiments, the error summary 240 may similarly indicate the relative timing of the error(s), the relationships or causation among the error(s), and the like.

In some embodiments, the error summary 240 is provided to one or more other systems (e.g., reported to an administrator or other user), such as to a system that controls the operations of the central system 230. In some embodiments, based on the error summary 240, the control system 205 (or another system or user) may take a variety of actions to remediate the error. For example, various actions may be taken to correct any issues caused by the error(s) (e.g., to ensure that the relevant information affected by the error was processed and/or stored properly, despite the error(s)) and/or to prevent (or at least reduce the probability) the error from reoccurring. Generally, a wide variety of actions may be taken based on the error summary 240. Advantageously, by using dynamic error windows with durations determined based on a variety of features during runtime, the control system 205 ensures that relevant related or similar errors are grouped together and the subsequent errors caused by a prior error are not included in a different summary. This substantially improves the troubleshooting and error correction process, which improves the operations and functionality of the computing environment 200 significantly.

Figure 3:
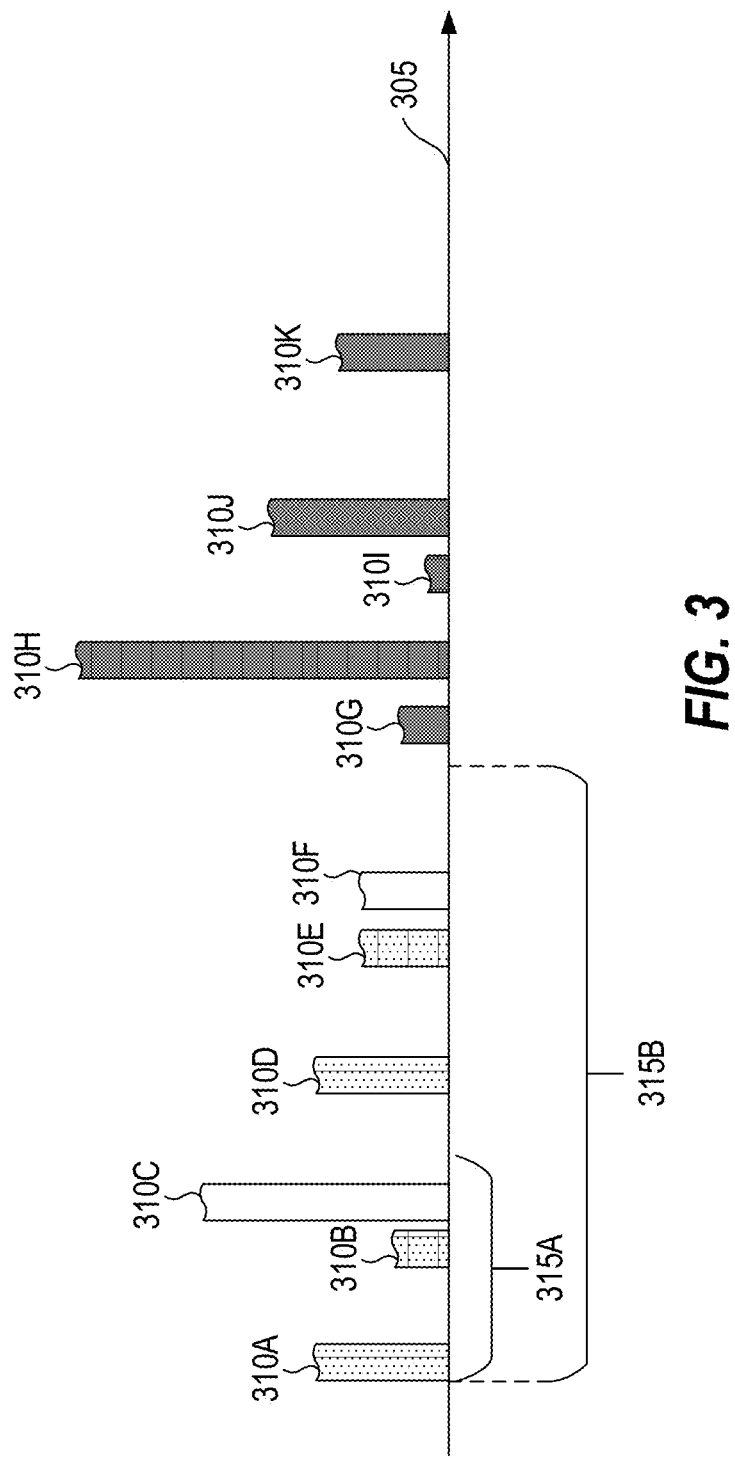
FIG. 3 depicts a timeline of error logs and updated error analysis windows for a computing environment, according to some embodiments of the present disclosure.

Example Timeline of Error Logs and Updated Error Analysis Windows for a Computing Environment FIG. 3 depicts a timeline 305 of error logs and updated error analysis windows for a computing environment, according to some embodiments of the present disclosure.

In the illustrated example, errors 310A-K (e.g., corresponding to error logs 235 of FIG. 2) are depicted along the timeline 305, where errors 310 to the left of FIG. 3 occurred earlier than errors to the right. For example, the error 310A occurred earlier than the error 310B, and so on. Additionally, in the illustrated example, the relative priorities of each error 310 are indicated based on the height of the depiction. For example, the error 310H may have the highest priority, while the error 310I may have the lowest. In some embodiments, as discussed above, the error priority may be determined based on a defined mapping or scoring.

Further, in the illustrated example, the errors 310 are depicted with varying levels of stippling to indicate their relationships or similarity. Specifically, the errors 310A, 310B, 310D, and 310E are similar (e.g., corresponding to a group or set of similar error logs), the errors 310C and 310F are similar, and the errors 310G, 310H, 310I, 310J, and 310K are similar.

In some embodiments, as discussed above, error logs are included or excluded from any given error analysis window based on this similarity. For example, the errors 310A, 310B, 310D, and 310E may be included in a first error analysis window. However, the errors 310C and 310F may be excluded from the first window because these errors are not "similar" to the error(s) 310A, 310B, 310D, and/or 310E. That is, even though the errors 310C and 310F may have occurred during the window, they may be reported directly, rather than including them in the analysis window, because they are unrelated to the errors in the window. In some embodiments, as discussed above, the set of similar errors is determined using defined mapping(s) indicating the relationships and/or causation among error codes. In some embodiments, no new analysis windows are opened until the existing (open) window closes. During the window, all unrelated errors may be reported directly. When the window closes, a new window may be opened if a new error is received.

As discussed above, in some embodiments, the control system (e.g., the control system 205 of FIG. 2) can determine whether to add each error 310 to the existing window (if any) or to report the new error directly based on its similarity to the error(s) in the existing window. For example, in some embodiments, when the error 310A occurs (e.g., when the error log corresponding to the occurrence of the error 310A is generated), the control system may determine to open an error analysis window with an initial duration indicated by the span 315A. In some embodiments, as discussed above, the control system may determine the initial span based on a defined mapping between error codes and window durations. That is, the control system may look up the analysis duration for the error code of the error 310A, and establish a window with that duration.

In some embodiments, during the analysis window, the control system evaluates newly received error logs to determine whether to add them to the open window, or to directly report them. Specifically, in the illustrated example, when the error 310B occurs, the control system determines that the error 310B is similar to the error 310A (e.g., based on defined similarity mappings), and that the error analysis window for the error 310A is still open (as indicated by the span 315A). Therefore, the control system adds the error 310B to the first window.

In the illustrated example, the control system can further evaluate the error 310B to determine whether to extend the duration of the window. For example, as discussed above, the control system may determine whether the error 310B occurred within the first half of the span 315A or the second half. In the illustrated example, because the error 310B occurred in the second half of the initial duration, the control system determines to extend the window (as indicated by span 315B). As discussed above, this can ensure that any additional related errors are captured in the window. In some embodiments, as discussed above, the length that the window is extended may be determined based on the extension value associated with the highest priority error in the window. For example, when the error 310B occurs, the control system may determine that the error 310A is the highest priority error in the window, and may therefore extend the window based on the extension value defined for the error code corresponding to the error 310A.

Although the illustrated example depicts extending the analysis window to the span 315B, in some embodiments, the control system may extend the window a smaller amount, and then extend it again when another similar error (e.g., the error 310D) occurs. For example, the control system may extend the window a first time, and when the error 310D occurs, the control system may determine that this error is in the second half of the (expanded) window. The control system may therefore determine to extend the window again (e.g., to the span 315B). In some embodiments, once the extension has reached a maximum duration (e.g., the duration or extension of the highest priority error in the window), the control system may refrain from further extensions, even if another similar error is received. For example, despite the error 310E, the control system may refrain from extending beyond the span 315B if this cap has been reached. In some embodiments, if the new error has a higher priority than any other error in the window, the control system may determine a new extension cap based on this new error, and extend the window accordingly.

In the illustrated example, when the error 310C occurs, the control system may determine that it does not belong to the first analysis window (e.g., because it is dissimilar to the error 310A that is the root of the window, and/or dissimilar from other error(s) in the window). The control system may therefore refrain from opening an error analysis window for the error 310C, and may instead report the error 310C immediately. As discussed above, when the errors 310D and 310E occur, the control system determines that they are similar to the error 310A, and therefore adds them to the first error analysis window.

Further, when the error 310F occurs, the control system determines that it does not belong to the error analysis window (initiated based on the error 310A), and reports the error 310F directly. Additionally, when the error 310G occurs, the control system determines to open a new error analysis window because the previous error analysis window (initiated by the error 310A) has closed.

In some embodiments, similar errors may be assigned to different windows (e.g., if the first error analysis window closes before the second error occurs). That is, even if two errors are similar, they may be included in different windows based on their timing (e.g., because the latter error is not likely to be related to the prior error, as indicated by the fact that the error analysis window for the prior error has already closed).

In some embodiments, as discussed above, once the control system determines that an error analysis window has closed (e.g., the determined duration, including any extensions, as elapsed), the control system can generate a summary of the error(s) included in the window. For example, as discussed above, the control system may generate a sequential list of error logs corresponding to the similar errors 310.

Although not depicted in the illustrated example, in some embodiments, the control system may similarly extend analysis windows based on other factors, such as the noisiness of the system, the resource utilization of the system, and the like. For example, as discussed above, when determining whether to extend the error analysis window corresponding to the errors 310A, 310B, 310D, and 310E, the control system may determine the number of dissimilar errors (e.g., errors 310C, and 310F) that occur during the window. If this number exceeds a threshold, the control system may extend the duration of the analysis window for the errors 310A, 310B, 310C, and 310E to account for potential delay in error occurrence and/or processing. Similarly, when determining whether to extend the error analysis window, the control system may evaluate resource utilization (e.g., memory and/or processor consumption or usage) during the window, and may increase the window duration if the utilization exceeds one or more thresholds.

In some embodiments, as discussed above, the length of the extension can be determined based on the value associated with the highest priority error in the window, regardless of the cause of the extension. That is, regardless of whether the window for errors 310C and 310F is extended due to receipt of additional similar errors, presence of environment noise (e.g. dissimilar errors), excessive resource utilization, or any other reason, the control system may determine the extension limit based on the error 310C.

Example Method for Updating Error Analysis Windows in a Computing Environment

Figure 4:
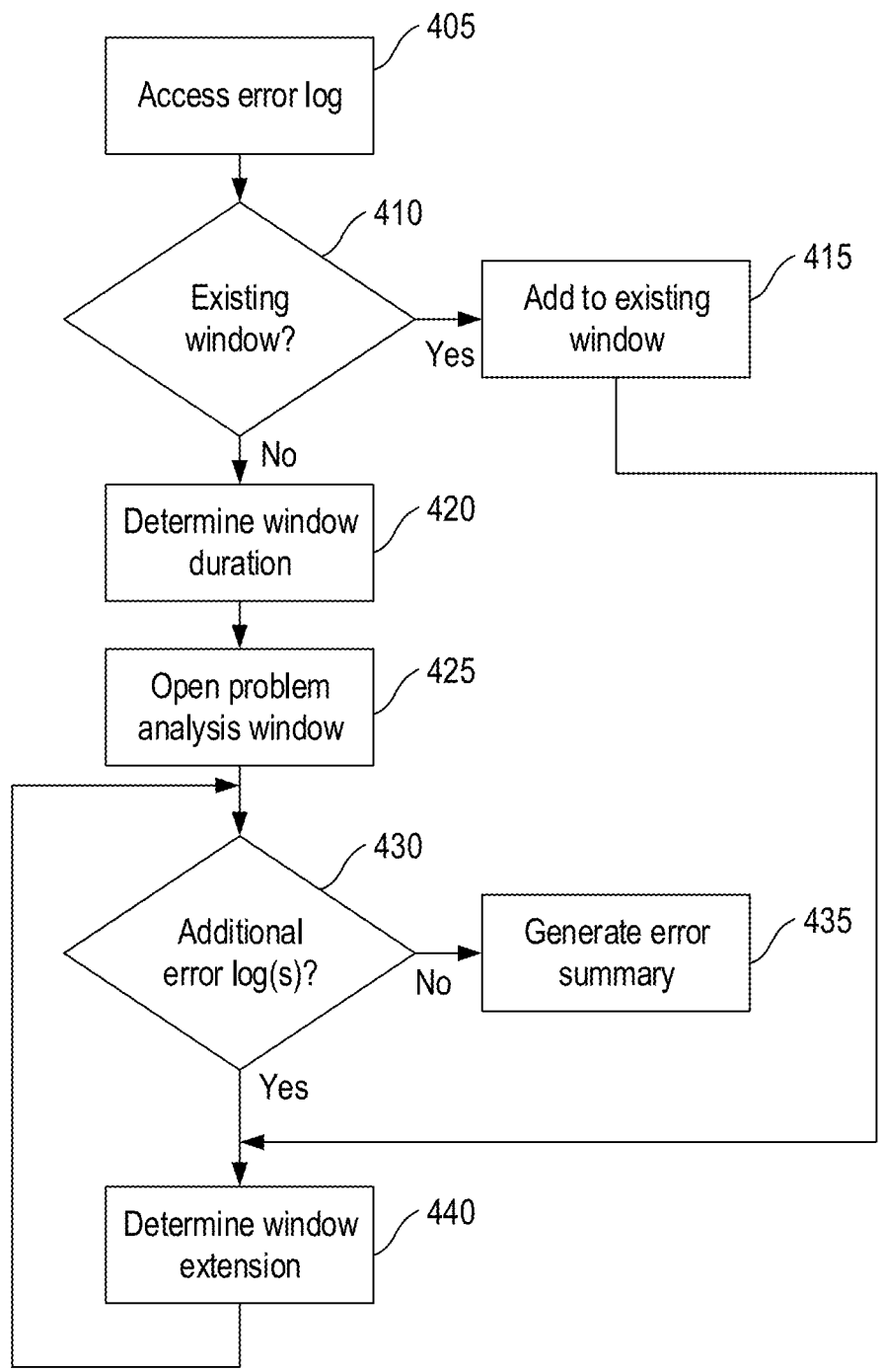
FIG. 4 is a flow diagram depicting an example method for updating error analysis windows in a computing environment, according to some embodiments of the present disclosure.

FIG. 4 is a flow diagram depicting an example method 400 for updating error analysis windows in a computing environment, according to some embodiments of the present disclosure. In some embodiments, the method 300 is performed by a control system, such as the control system 205 of FIG. 2.

At block 405, the control system accesses an error log (e.g., the error log 235 of FIG. 2). As discussed above, this may include receiving the error log from another system (e.g., the central system 230 of FIG. 2) and/or generating the error log locally by the control system. In some embodiments, as discussed above, the error log includes information such as an error or reference code indicating the error that occurred, a timestamp indicating when the error occurred, and/or any other relevant information about the error (e.g., indicating what system it occurred on, the priority of the error, affected operations, and the like).

At block 410, the control system determines whether the error log should be added to an existing error analysis window. For example, as discussed above, the control system may determine whether there is an open analysis window, and determine (e.g., based on a defined similarity mapping) whether the new error log is similar to the existing window (e.g., similar to the root error of any open window). If so, the method 400 continues to block 415, where the control system adds the error log to the existing window to which it belongs. The method 400 then continues to block 440, discussed in more detail below.

Returning to block 410, if the control system determines that the error log does not correspond to any existing window, the method 400 continues to block 420. In some aspects, the method 400 continues to block 400 only if no other error analysis windows are open. That is, if there is an open error analysis window, the control system may instead immediately report the new error log, and terminate. At block 420, the control system determines an initial window duration for the analysis window (if one is not open already) based on the error log. For example, as discussed above, the control system may evaluate a defined mapping indicating the (initial) duration that should be used for the error log based on the error code.

At block 425, the control system opens a problem or error analysis window for the error log, using the initial duration.

At block 430, the control system determines whether one or more additional error logs have been generated during the window. In some embodiments, at block 430, the control system determines whether any similar or related error logs have been generated. If not (e.g., if the determined window duration has expired with no further similar error logs), the method 400 continues to block 435, where the control system generates an error summary for the window. As discussed above, the error summary may generally include information related to the error(s), such as a sequential list of the related error logs. This summary may then be reported.

Returning to block 430, if the control system determines that at least one additional (similar) error log has occurred, the method 400 continues to block 440. At block 440, the control system determines a window extension for the active window based at least in part on the newly generated error log(s), as discussed above. In some embodiments, for example, the control system may evaluate features such as the similarity of the new logs, the timing of the new error logs relative to the first error log (accessed at block 405) and/or the current window duration, the noisiness of the computing environment, the resource utilization of the system, and the like. One example method for determining the window extension is discussed in more detail below with reference to FIG. 5.

After determining the appropriate extension (and extending the duration of the window accordingly), the method 400 returns to block 430. In this way, the control system may continue to monitor the computing environment to dynamically adjust the error analysis windows, substantially improving the accuracy and performance of the error remediation procedures.

Example Method for Evaluating Error Logs to Improve Error Analysis Windows

Figure 5:
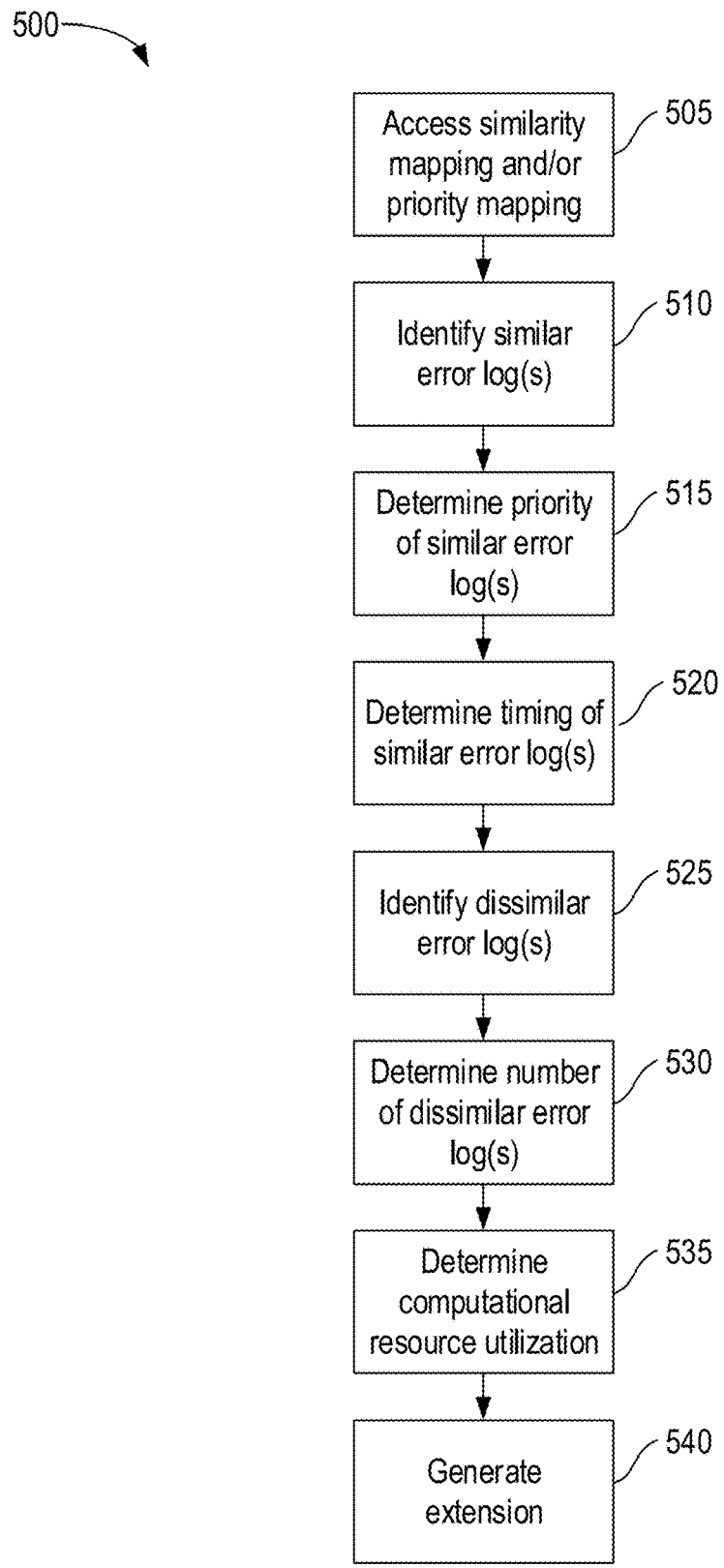
FIG. 5 is a flow diagram depicting an example method for evaluating error logs to improve error analysis windows, according to some embodiments of the present disclosure.

FIG. 5 is a flow diagram depicting an example method 500 for evaluating error logs to improve error analysis windows, according to some embodiments of the present disclosure. In some embodiments, the method 400 is performed by a control system, such as the control system 205 of FIG. 2. In some embodiments, the method 400 provides additional detail for the block 440 of FIG. 4.

At block 505, the control system accesses a similarity mapping and/or priority mapping for error codes in the computing environment. As discussed above, the similarity mapping generally indicates the relationships among error codes in the system, such as whether any given set of errors are similar, related, causal, and the like (or a degree or magnitude of such a relationship). In some embodiments, as discussed above, the priority mapping may generally indicate the relative priorities of the error code(s) in the environment, the analysis duration and/or extension associated with each, and the like.

At block 510, the control system identifies a set of similar error logs. For example, as discussed above, the control system may use the similarity mapping to determine the set of similar errors within the current analysis window. The window extension may be determined based on these similar logs. As discussed above.

At block 515, the control system determines the priority of each of the similar error logs. For example, as discussed above, the control system may determine the amount of time by which to extend the window based on the extension or duration value associated with the error log having the highest priority in the window.

At block 520, the control system determines the timing of the similar error logs relative to each other and/or relative to the window itself. In some embodiments, as discussed above, the control system may determine whether to extend the window based on the timing of the logs. For example, if the most recent similar error log occurred in the second half (or some other defined portion, such as the last quarter) of the current analysis window, the control system may determine that an extension should be made. If the most recent error was in the first half (or some other defined portion) of the window, the control system may determine that the window should not be extended (yet).

At block 525, the control system identifies a set of dissimilar error logs. That is, the control system may identify any errors that occurred during the analysis window as the set of similar logs, but that are dissimilar from the set of similar logs. In some embodiments, as discussed above, one or more of the dissimilar logs may be similar to each other. However, these are referred to as dissimilar errors to indicate that they are not similar or related to the set of error log(s) being evaluated to determine the window extension.

At block 530, the control system determines the number of dissimilar errors (e.g., the size of the set of dissimilar error logs). In some embodiments, as discussed above, if the number of contemporaneous dissimilar errors satisfies one or more criteria (e.g., meeting or exceeding a threshold), the control system may determine to extend the window.

At block 535, the control system determines computational resource utilization of one or more computational resources in the computing environment. For example, as discussed above, the control system may determine the memory usage, processor usage, and the like. Generally, the control system may evaluate the usage or utilization of any resources that may impact the timing of error logs, including when the error(s) themselves occur (e.g., if an error may be delayed because the process that causes the error is delayed by lack of memory), as well as when the error logs are generated. As discussed above, the control system may determine to extend the analysis window if the utilization satisfies defined criteria (e.g., meeting or exceeding a threshold).

At block 540, the control system generates window extension based on one or more of the above-discussed features, as discussed above. For example, as discussed above, the control system may generate an extension if one or more similar error logs occurred in a defined portion of the analysis window, if the set of dissimilar error logs satisfies one or more criteria, if the resource utilization satisfies one or more criteria, and the like.

Further, in some embodiments, generating the extension may include determining the amount of the extension. In some embodiments, as discussed above, the control system may determine the extension based on a maximum duration corresponding to the highest priority error in the set of similar error logs.

In these ways, as discussed above, the control system can dynamically adjust or modify the error analysis, resulting in substantially improved analysis, and reduced resource waste.

Example Method for Generating Error Summaries

Figure 6:
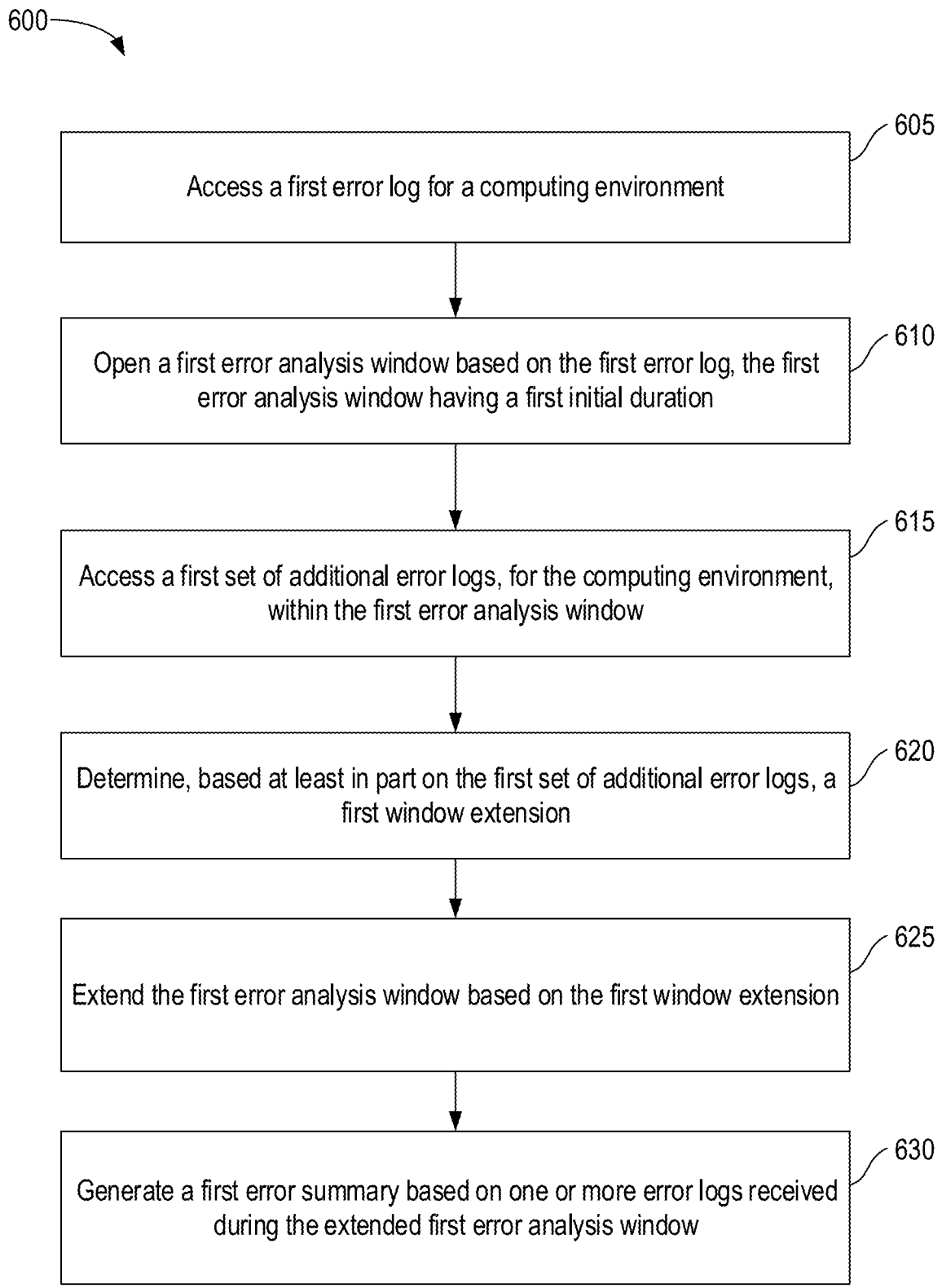
FIG. 6 is a flow diagram depicting an example method for generating error summaries, according to some embodiments of the present disclosure.

FIG. 6 is a flow diagram depicting an example method 600 for generating error summaries, according to some embodiments of the present disclosure. In some embodiments, the method 600 is performed by a control system, such as the control system 205 of FIG. 2.

At block 605, a first error log (e.g., the error log 235 of FIG. 2) for a computing environment (e.g., the computing environment 200 of FIG. 2) is accessed.

At block 610, a first error analysis window is opened based on the first error log, the first error analysis window having a first initial duration (e.g., corresponding to the span 315A of FIG. 3).

At block 615, a first set of additional error logs, for the computing environment, within the first error analysis window is accessed.

At block 620, based at least in part on the first set of additional error logs, a first window extension is determined.

At block 625, the first error analysis window is extended based on the first window extension (e.g., corresponding to the span 315B of FIG. 3).

At block 630, a first error summary (e.g., the error summary 240 of FIG. 2) is generated based on one or more error logs received during the extended first error analysis window.

While the foregoing is directed to embodiments of the present invention, other and further embodiments of the invention may be devised without departing from the basic scope thereof, and the scope thereof is determined by the claims that follow.

What is claimed is:

1. A method, comprising:
   monitoring operations of one or more computing systems in a computing environment to generate one or more error logs representing one or more errors occurring in the operations;
   accessing a first error log for the computing environment;
   opening a first error analysis window based on the first error log, the first error analysis window having a first initial duration;
   accessing a first set of additional error logs, for the computing environment, within the first error analysis window;
   determining, based at least in part on the first set of additional error logs, a first window extension;
   extending the first error analysis window based on the first window extension;
   generating a first error summary based on one or more error logs received during the extended first error analysis window; and
   remediating the one or more errors, based on the first error summary, in the computing environment.

2. The method of claim 1, wherein accessing the first error log and the first set of additional error logs comprises:
   obtaining an error code of errors in error logs;
   identifying similarity between the errors based on the error code; and
   generating a similarity mapping based on the similarity between the errors;
   wherein determining the first window extension comprises:
   determining, based on the similarity mapping, a first set of similar error logs, from the first set of additional error logs, that are similar to the first error log; and
   determining the first window extension based on the first set of similar error logs.

3. The method of claim 2, wherein determining the first window extension based on the first set of similar error logs comprises determining to extend the first error analysis window based on determining that at least one similar error log of the first set of similar error logs occurred within a defined portion of the first error analysis window.

4. The method of claim 2, further comprising:
   opening a second error analysis window based on a second error log;
   accessing a second set of additional error logs, for the computing environment, within the second error analysis window;
   determining, based on the similarity mapping, a second set of similar error logs, from the second set of additional error logs, that are similar to the second error log; and
   determining to refrain from extending the second error analysis window based on the second set of similar error logs.

5. The method of claim 2, wherein determining the first window extension comprises:
   determining, based on a priority mapping, a respective priority value for each respective error log of the first set of similar error logs; and
   determining the first window extension based on a defined extension amount of a highest priority error log of the first set of similar error logs.

6. The method of claim 2, wherein determining the noisiness comprises:
   determining, based on the similarity mapping, a first set of dissimilar error logs, from the first set of additional error logs, that are not similar to the first error log; and
   determining a size of the first set of dissimilar error logs.

7. The method of claim 1, wherein determining the first window extension comprises:
   determining a noisiness of the computing environment based on the first set of additional error logs; and
   determining the first window extension based on the noisiness.

8. The method of claim 1, wherein determining the first window extension further comprises:
   determining a computational resource utilization of the computing environment; and
   determining the first window extension based on the computational resource utilization.

9. A system comprising:
   one or more memories collectively storing computer-executable instructions; and
   one or more processors configured to collectively execute the computer-executable instructions and cause the system to perform an operation comprising:
   monitoring operations of one or more computing systems in a computing environment to generate one or more error logs representing one or more errors occurring in the operations;
   accessing a first error log for the computing environment;
   opening a first error analysis window based on the first error log, the first error analysis window having a first initial duration;
   accessing a first set of additional error logs, for the computing environment, within the first error analysis window;
   determining, based at least in part on the first set of additional error logs, a first window extension;
   extending the first error analysis window based on the first window extension;
   generating a first error summary based on one or more error logs received during the extended first error analysis window; and
   remediating the one or more errors, based on the first error summary, in the computing environment.

10. The system of claim 9, wherein accessing the first error log and the first set of additional error logs comprises:
   obtaining an error code of errors in error logs;
   identifying similarity between the errors based on the error code; and
   generating a similarity mapping based on the similarity between the errors;
   wherein determining the first window extension comprises:
   determining, based on the similarity mapping, a first set of similar error logs, from the first set of additional error logs, that are similar to the first error log; and
   determining the first window extension based on the first set of similar error logs.

11. The system of claim 10, the operation further comprising:
   opening a second error analysis window based on a second error log;
   accessing a second set of additional error logs, for the computing environment, within the second error analysis window;
   determining, based on the similarity mapping, a second set of similar error logs, from the second set of additional error logs, that are similar to the second error log; and
   determining to refrain from extending the second error analysis window based on the second set of similar error logs.

12. The system of claim 10, wherein determining the first window extension comprises:
   determining, based on a priority mapping, a respective priority value for each respective error log of the first set of similar error logs; and
   determining the first window extension based on a defined extension amount of a highest priority error log of the first set of similar error logs.

13. The system of claim 9, wherein determining the first window extension comprises:
   determining a noisiness of the computing environment based on the first set of additional error logs; and
   determining the first window extension based on the noisiness.

14. The system of claim 9, wherein determining the first window extension further comprises:
   determining a computational resource utilization of the computing environment; and
   determining the first window extension based on the computational resource utilization.

15. A computer program product, comprising a computer-readable storage medium having computer-readable program code executable to cause the computer program product to perform an operation comprising:
   monitoring operations of one or more computing systems in a computing environment to generate one or more error logs representing one or more errors occurring in the operations;
   accessing a first error log for the computing environment;
   opening a first error analysis window based on the first error log, the first error analysis window having a first initial duration;
   accessing a first set of additional error logs, for the computing environment, within the first error analysis window;
   determining, based at least in part on the first set of additional error logs, a first window extension;
   extending the first error analysis window based on the first window extension;
   generating a first error summary based on one or more error logs received during the extended first error analysis window; and
   remediating the one or more errors, based on the first error summary, in the computing environment.

16. The computer program product of claim 15, wherein accessing the first error log and the first set of additional error logs comprises:
   obtaining an error code of errors in the error logs;
   identifying similarity between the errors based on the error code; and
   generating a similarity mapping based on the similarity between the errors;
   wherein determining the first window extension comprises:
   determining, based on the similarity mapping, a first set of similar error logs, from the first set of additional error logs, that are similar to the first error log; and
   determining the first window extension based on the first set of similar error logs.

17. The computer program product of claim 16, the operation further comprising:
   opening a second error analysis window based on a second error log;
   accessing a second set of additional error logs, for the computing environment, within the second error analysis window;
   determining, based on the similarity mapping, a second set of similar error logs, from the second set of additional error logs, that are similar to the second error log; and
   determining to refrain from extending the second error analysis window based on the second set of similar error logs.

18. The computer program product of claim 16, wherein determining the first window extension comprises:
   determining, based on a priority mapping, a respective priority value for each respective error log of the first set of similar error logs; and
   determining the first window extension based on a defined extension amount of a highest priority error log of the first set of similar error logs.

19. The computer program product of claim 15, wherein determining the first window extension comprises:
   determining a noisiness of the computing environment based on the first set of additional error logs; and
   determining the first window extension based on the noisiness.

20. The computer program product of claim 15, wherein determining the first window extension further comprises:
   determining a computational resource utilization of the computing environment; and
   determining the first window extension based on the computational resource utilization.

* * * * *